United States Patent
Kim (10) Patent No.: US 12,459,566 B2
(45) Date of Patent: Nov. 4, 2025

(54) APPARATUS AND METHOD FOR CONTROLLING 4-WHEEL INDEPENDENT STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 15 days.

(21) Appl. No.: 18/527,503

(22) Filed: Dec. 4, 2023

(65) Prior Publication Data

US 2024/0425110 A1    Dec. 26, 2024

(30) Foreign Application Priority Data

Jun. 20, 2023  (KR) ........................ 10-2023-0078790

(51) Int. Cl.
  *B62D 7/15*       (2006.01)
(52) U.S. Cl.
  CPC .................................. *B62D 7/159* (2013.01)
(58) Field of Classification Search
  CPC ...... B62D 7/159; B62D 7/1509; B62D 1/046; B62D 6/002; B62D 6/007; B62D 5/0409; B62D 5/0457; B60Y 2400/84
  See application file for complete search history.

(56) References Cited

U.S. PATENT DOCUMENTS

| | | | |
|---|---|---|---|
| 7,114,591 B2 | 10/2006 | Toyooka et al. | |
| 2014/0305715 A1* | 10/2014 | Makino | B60K 17/358 180/6.24 |

FOREIGN PATENT DOCUMENTS

| | | | | |
|---|---|---|---|---|
| DE | 102009000452 B4 * | 7/2015 | .......... | B60W 10/111 |
| DE | 102018127929 A1 | 5/2020 | | |
| KR | 10-2274120 B1 | 7/2021 | | |

OTHER PUBLICATIONS

Extended European Search Report issued on May 8, 2024 in the corresponding European Patent Application No. 23208716.3.

* cited by examiner

*Primary Examiner* — Lindsay M Low
*Assistant Examiner* — Charles J Brauch
(74) *Attorney, Agent, or Firm* — NovoTechIP International PLLC (57) ABSTRACT

An apparatus for controlling a 4-wheel independent steering system of a vehicle. The apparatus includes a sensor module, a switch module including a plurality of switches for receiving an instruction for the transition of a steering mode of the 4-wheel independent steering system, and a processor configured to perform a steering mode transition operation of the 4-wheel independent steering system based on a combination of the switches of the switch module.

9 Claims, 7 Drawing Sheets

APPARATUS AND METHOD FOR CONTROLLING 4-WHEEL INDEPENDENT STEERING SYSTEM

CROSS-REFERENCE TO RELATED APPLICATIONS

This application claims priority from and the benefit of Korean Patent Application No. 10-2023-0078790, filed on Jun. 20, 2023, which is hereby incorporated by reference for all purposes as if set forth herein.

TECHNICAL FIELD

Exemplary embodiments of the present disclosure relate to an apparatus and method for controlling a 4-wheel independent steering system, and more particularly, to an apparatus and method for controlling a 4-wheel independent steering system, which enable a steering mode transition operation of a 4-wheel independent steering system to be performed.

BACKGROUND

Recently, an in-wheel motor system in which a motor is embedded in each of four wheels of a vehicle and the four wheels can be independently driven is developed.

There is an advantage in that more flexible and various driving performance can be provided by implementing a 4-wheel independent driving and 4-wheel independent steering system by organizationally coupling such an in-wheel motor system with a vehicle.

In the existing common vehicle, the direction of progress of the vehicle is changed by steering only front wheels. In this case, the direction of progress of the vehicle and a driver's gaze direction are not matched with each other because timing at which a lateral force of the front wheels occurs and timing at which a lateral force of rear wheels occurs are different from each other. However, a 4-wheel independent steering system reduces a radius of rotation of a vehicle upon parking or low-speed turn by also applying the steering system to the rear wheels, and improves driving stability when the direction of the vehicle is turned during high-speed driving.

Conventionally, a steering mode transition operation is performed by installing a plurality of switches corresponding to modes (e.g., a left crab mode (i.e., a left right-angle driving mode), a right crab mode (i.e., a right right-angle driving mode), a spin mode, a reverse phase mode, an in-phase mode, and a gear ratio variable mode) of a 4-wheel independent steering system, respectively, and manipulating a corresponding switch.

Accordingly, there are problems in that many spaces for installing the switches are required and a driver may feel confused in selecting a switch corresponding to a mode.

Accordingly, there is a need for a method capable of conveniently performing a steering mode transition operation of a 4-wheel independent steering system by using a smaller number of switches than the existing number of switches.

The Background Art of the present disclosure is disclosed in Korean Patent No. 10-2274120 (registered on Jul. 1, 2021 and entitled "CONTROL APPARATUS AND METHOD FOR REAR WHEEL STEERING SYSTEM").

SUMMARY

Various embodiments are directed to providing an apparatus and method for controlling a 4-wheel independent steering system, which enable a steering mode transition operation of a 4-wheel independent steering system to be performed.

In an embodiment, an apparatus for controlling a 4-wheel independent steering system includes a sensor module, a switch module including a plurality of switches for receiving an instruction for the transition of a steering mode of the 4-wheel independent steering system, and a processor configured to perform a steering mode transition operation of the 4-wheel independent steering system based on a combination of the switches of the switch module.

In an embodiment of the present disclosure, the switch module includes a first switch and a second switch included in a steering wheel.

In an embodiment of the present disclosure, the switches of the switch module are provided on left and right sides, respectively, on the basis of a central axis of a steering wheel.

In an embodiment of the present disclosure, the processor continues to maintain a left crab mode if a steering mode that is maintained so far is the left crab mode when only a first switch (LCS) is selected, enters a left crab mode if a steering mode that is maintained so far is not the left crab mode and is a neutral (N) mode, a brake pedal has been stepped on (Brake Pedal ON), and a vehicle is not in a driving state (a vehicle speed=0), when only the first switch (LCS) is selected, and performs an operation of transition to a reverse phase mode if a steering mode that is maintained so far is neither the left crab mode nor the neutral (N) mode when only the first switch (LCS) is selected.

In an embodiment of the present disclosure, the reverse phase mode is a mode in which front wheels and rear wheels are controlled to have a reverse phase. The operation of transition to the reverse phase mode is a mode in which an operation of decreasing a gear ratio from a current gear ratio state to −1 is performed during the time for which the first switch (LCS) is selected.

In an embodiment of the present disclosure, the processor continues to maintain a right crab mode if a steering mode that is maintained so far is the right crab mode when only the second switch (RCS) is selected, enters the right crab mode if a steering mode that is maintained so far is not the right crab mode and is a neutral (N) mode, a brake pedal has been stepped on (Brake Pedal ON), and a vehicle is not in a driving state when only the second switch (RCS) is selected, and performs an operation of transition to an in-phase mode if a steering mode that is maintained so far is neither the right crab mode nor the neutral (N) mode when only the second switch (RCS) is selected.

In an embodiment of the present disclosure, the in-phase mode is a mode in which front wheels and rear wheels are controlled to have the same phase. The operation of transition to the in-phase mode is a mode in which an operation of increasing a gear ratio from a current gear ratio state to 1 is performed during the time for which the second switch (RCS) is selected.

In an embodiment of the present disclosure, the processor continues to maintain a spin mode when a steering mode that is maintained so far is the spin mode when the first switch (LCS) and the second switch (RCS) are simultaneously selected, enters the spin mode if a steering mode that is maintained so far is not the spin mode and is a neutral (N) mode, a brake pedal has been stepped on (Brake Pedal ON), and a vehicle is not in a driving state (a vehicle speed=0) when the first switch (LCS) and the second switch (RCS) are simultaneously selected, and performs an operation of transition to a dynamic 4WS mode if a steering mode that is maintained so far is neither the spin mode nor the neutral (N) mode when the first switch (LCS) and the second switch (RCS) are simultaneously selected.

In an embodiment of the present disclosure, the dynamic 4WS mode is a mode in which gear ratios of front wheels and rear wheels are varied in response to a steering angle speed or angular acceleration, and is a mode in which a spin operation is performed in a corresponding direction when a steering wheel is turned left or right at a specific angle (®) or more upon operation of transition to the spin mode or the dynamic 4WS mode.

In an embodiment, a method of controlling a 4-wheel independent steering system includes receiving, by a processor, an instruction for transition of a steering mode of the 4-wheel independent steering system through a plurality of switches of a switch module, and performing, by the processor, a steering mode transition operation of the 4-wheel independent steering system based on a combination of the switches of the switch module.

According to an embodiment of the present disclosure, a steering mode transition operation of the 4-wheel independent steering system can be conveniently performed by using a smaller number of switches than the existing number of switches.

Furthermore, according to an embodiment of the present disclosure, a steering mode transition operation can be performed by using the switches included in the steering wheel.

Furthermore, according to an embodiment of the present disclosure, the transition of steering modes of the 4-wheel independent steering system can be organizationally performed without colliding against each other.

BRIEF DESCRIPTION OF THE DRAWINGS

FIG. 2A provides a side view of a steering wheel and FIG. 2B provides a front view of a steering wheel to show the locations of switches on steering wheel for selecting a steering mode transition operation.

DETAILED DESCRIPTION

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is a set of instructions executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an apparatus and method for controlling a 4-wheel independent steering system according to embodiments of the present disclosure will be described with reference to the accompanying drawings.

In this process, the thicknesses of lines or the sizes of components illustrated in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

Figure 1:
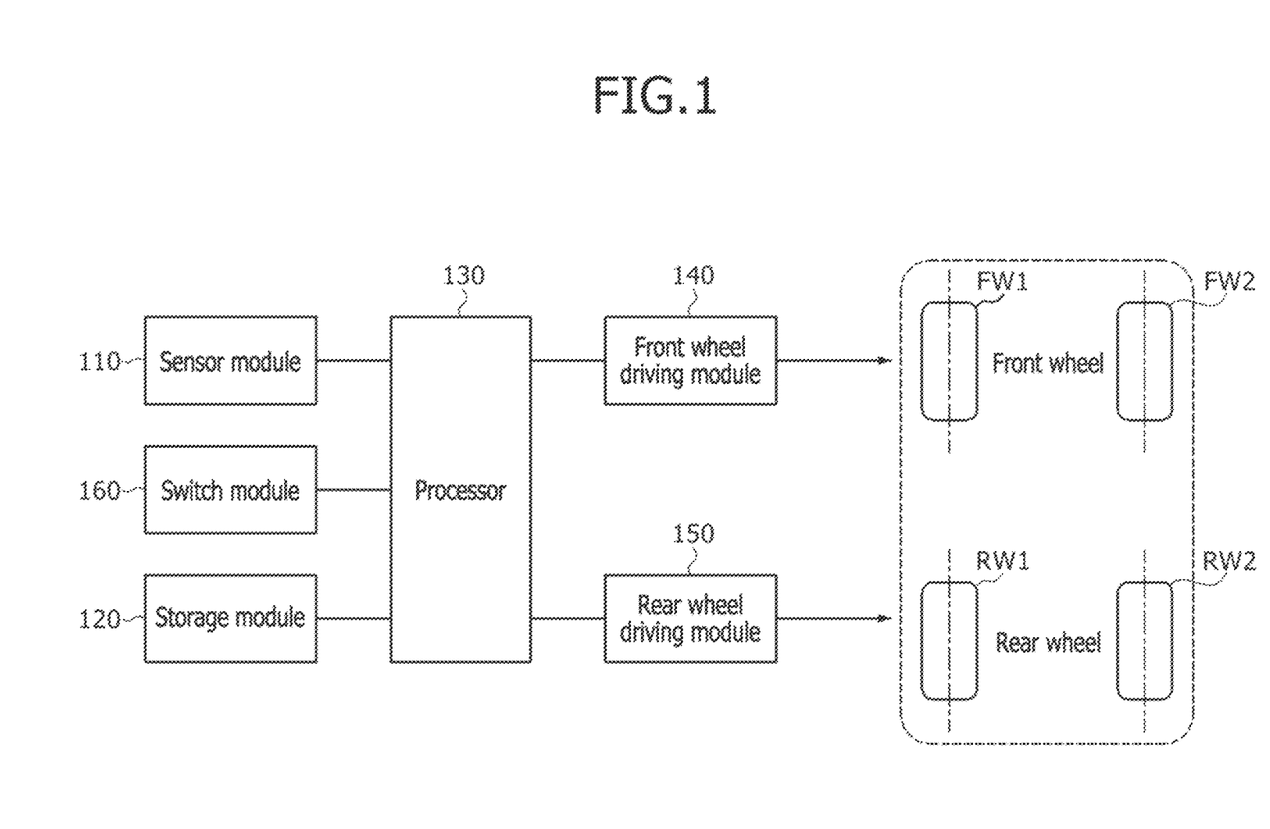
FIG. 1 is an exemplary diagram illustrating a schematic construction of an apparatus for controlling a 4-wheel independent steering system according to an embodiment of the present disclosure.
Figure 2A:
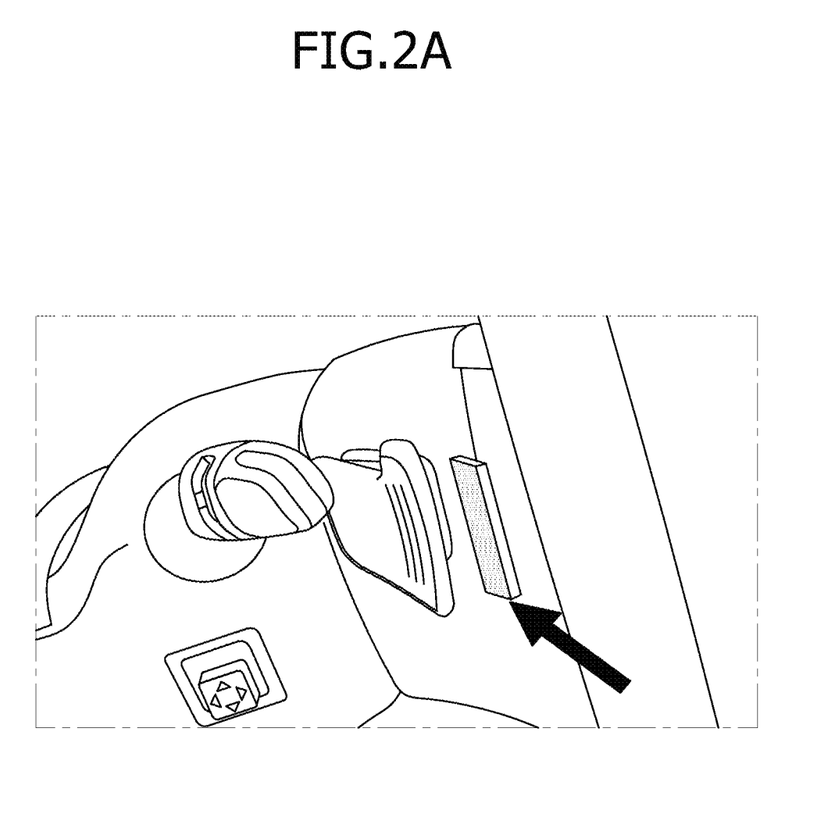
FIGS. 2A and 2B are exemplary diagrams illustrating switches included in a steering wheel in order to select a steering mode transition operation in FIG. 1.
Figure 2B:
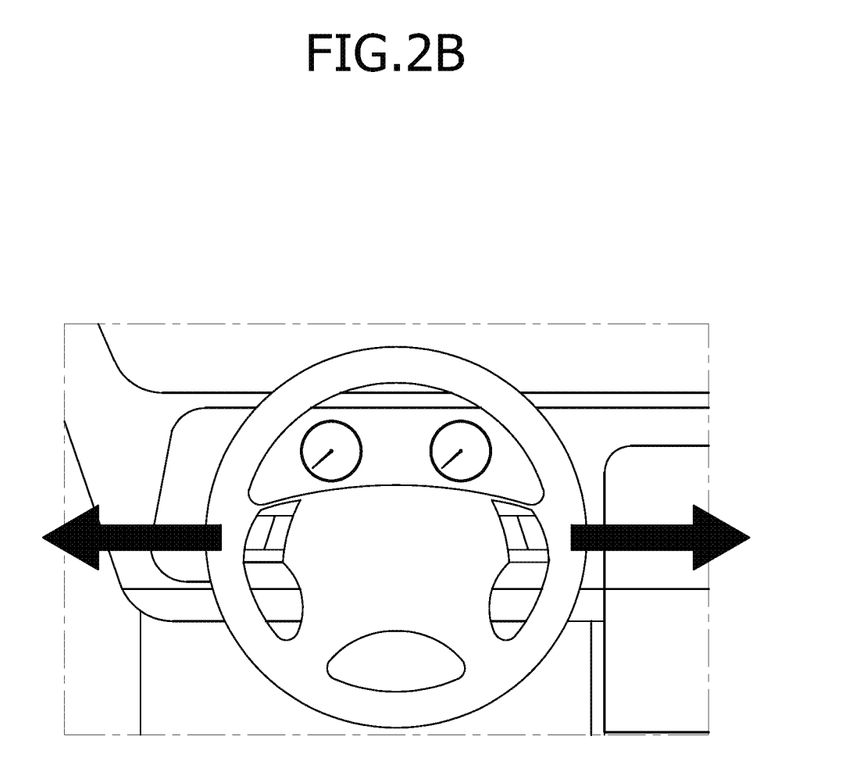

FIG. 1 is an exemplary diagram illustrating a schematic construction of an apparatus for controlling a 4-wheel independent steering system according to an embodiment of the present disclosure. FIGS. 2A and 2B are exemplary diagrams illustrating switches included in a steering wheel in order to select a steering mode transition operation in FIG. 1.

As illustrated in FIG. 1, the apparatus for controlling a 4-wheel independent steering system according to the present embodiment includes a sensor module 110, a storage module 120, a processor 130, a front wheel driving module 140, a rear wheel driving module 150, and a switch module 160.

The sensor module 110 may include a current sensor (i.e., a current detection sensor) and a steering angle sensor (i.e., a steering angle detection sensor).

The sensor module 110 may include wheel speed sensors included in front wheels and rear wheels, respectively, and an acceleration sensor for detecting the acceleration of a vehicle.

The sensor module 110 may sense information related to an operation of the vehicle, such as braking.

The processor 130 may measure a steering angle speed by using the steering angle sensor.

The processor 130 performs a steering mode transition operation of a 4-wheel independent steering system in response to the selection of each switch (e.g., a first switch or a second switch) of the switch module 160.

The processor 130 may calculate a target yaw rate value that is targeted by a driver, based on a steering angle when the driver performs steering, a driving direction, and a vehicle speed when the driver steps on an accelerator. At this time, driving forces may be optimally distributed to left rear wheels or right rear wheels in accordance with a target yaw rate value, and may be distributed by using a closed loop controller.

The storage module 120 stores an algorithm for the processor 130 to control the driving forces of the rear wheels and information (or data) detected through the sensor module 110.

In this case, the storage module 120 and the processor 130 may be implemented as separate chips, or may be implemented as a single chip having a form in which the storage module 120 is included in the processor 130.

Furthermore, the storage module 120 may be implemented as at least one of storage media, such as a cache, a nonvolatile memory device such as read only memory (ROM), programmable ROM (PROM), erasable programmable ROM (EPROM), electrically erasable programmable ROM (EEPROM), or flash memory, a volatile memory device such as random access memory (RAM), a hard disk drive (HDD), or CD-ROM, but the present disclosure is not limited thereto.

Furthermore, the processor 130 may be implemented as an electronic control unit (ECU) for controlling the driving of the vehicle.

The front wheel driving module 140 is connected to front wheels FW1 and FW2, and may drive the actuators (e.g., actuators that adjust rotation directions, rotation speeds, and steering angles of the front wheels by a motor or oil pressure) of the front wheels FW1 and FW2 under the control of the processor 130.

The front wheel driving module 140 may be included in the processor 130.

The rear wheel driving module 150 is connected to rear wheels RW1 and RW2, and may drive the actuators (e.g., actuators that adjust rotation directions, rotation speeds, and steering angles of the rear wheels by a motor or oil pressure) of the rear wheels RW1 and RW2 under the control of the processor 130.

The rear wheel driving module 150 may be included in the processor 130.

Furthermore, the processor 130 may control steering angles of the front wheels and the rear wheels identically or differently by controlling the front wheel driving module 140 and the rear wheel driving module 150.

The switch module 160 includes a plurality of switches (or buttons) (e.g., a first switch and a second switch) included in a steering wheel (refer to FIGS. 2A and 2B).

The switches (e.g., the first switch and the second switch) of the switch module 160 may be provided on the left and right sides, respectively, on the basis of the central axis of the steering wheel.

For example, referring to FIGS. 2A and 2B, FIG. 2A provides a side view of a steering wheel and FIG. 2B provides a front view of a steering wheel to show the locations of switches on steering wheel for selecting a steering mode transition operation. A first switch (i.e., a left control switch (LCS)) may be provided on the left side of the steering wheel, as shown in FIG. 2A. A second switch (i.e., a right control switch (RCS)) may be provided on the right side of the steering wheel, as shown in FIG. 2B.

Hereinafter, a steering mode transition operation of the processor 130 is described with reference to the flowcharts of FIGS. 3 to 5.

Figure 3:
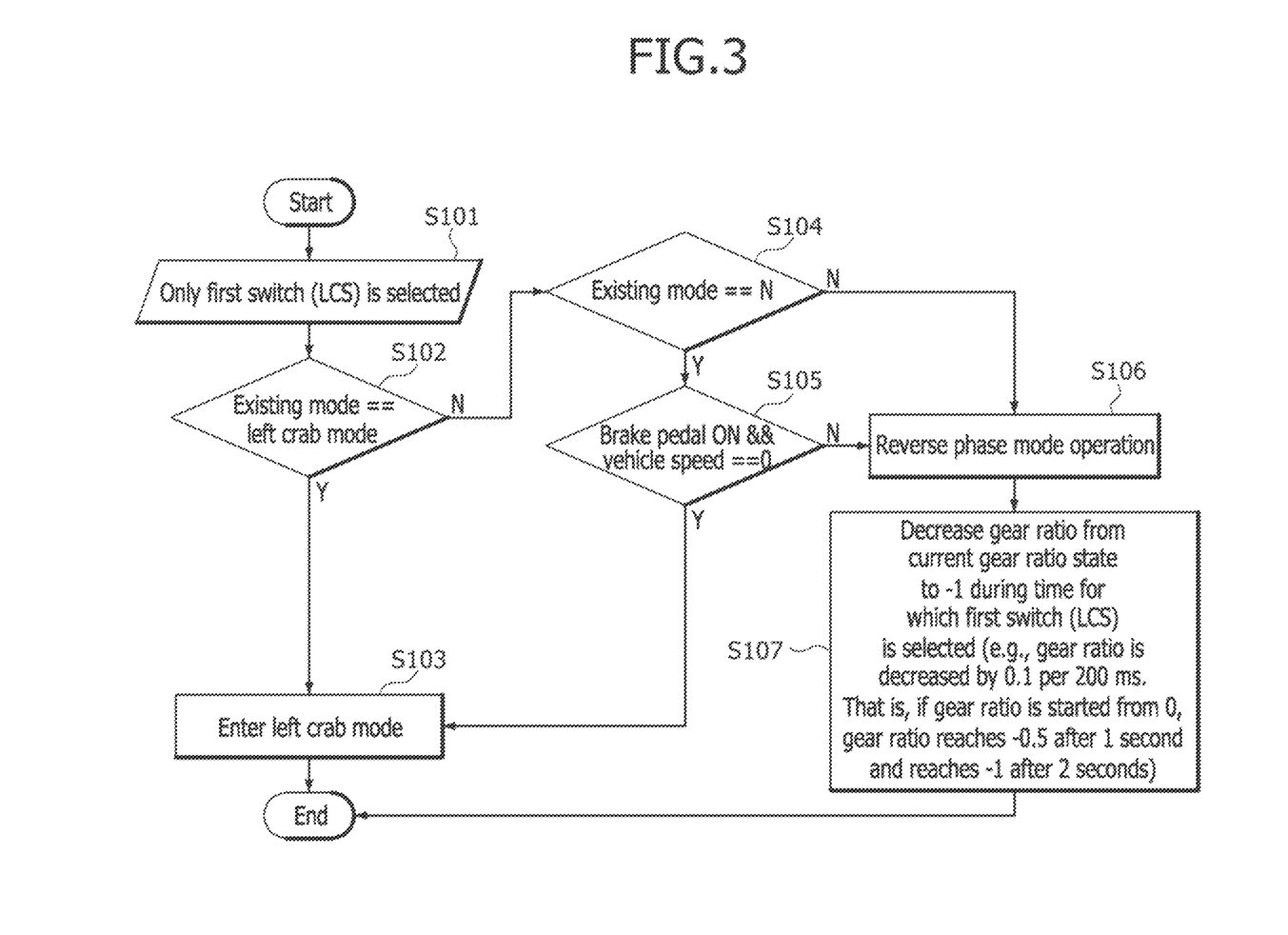
FIG. 3 is a flowchart for illustrating a steering mode transition operation according to the selection of a first switch (LCS) according to a first embodiment of the present disclosure.

FIG. 3 is a flowchart for illustrating a steering mode transition operation according to the selection of the first switch (LCS) according to a first embodiment of the present disclosure. FIG. 4 is a flowchart for illustrating a steering mode transition operation according to the selection of the second switch (RCS) according to a second embodiment of the present disclosure. FIG. 5 is a flowchart for illustrating a steering mode transition operation according to the selection of the first switch (LCS) and the second switch (RCS) according to a third embodiment of the present disclosure.

Referring to FIG. 3, when only the first switch (LCS) is selected (S101), if the existing mode (i.e., a steering mode that is maintained so far) is a left crab mode (Y (Yes) in S102), the processor 130 continues to enter (i.e., maintain) the left crab mode (S103).

When only the first switch (LCS) is selected (S101), if the existing mode (i.e., a steering mode that is maintained so far) is not the left crab mode (N (No) in S102) and is a neutral (N) mode, a brake pedal has been stepped on (Brake Pedal ON), and the vehicle is not in a driving state (i.e., a vehicle speed=0) (Y in S105), the processor 130 enters the left crab mode (S103).

That is, the left crab mode is entered when the first switch (LCS) is selected in the state in which a driver steps on the brake pedal and a condition in which the vehicle speed is 0.

When only the first switch (LCS) is selected (S101), if the existing mode (i.e., a steering mode that is maintained so far) is neither the left crab mode (N in S102) nor the neutral (N) mode (N in S104), the processor 130 performs an operation of transition to a reverse phase mode (i.e., a mode in which the front wheels and the rear wheels are controlled to have a reverse phase) (S106).

In this case, the reverse phase mode is a mode in which the front wheels and the rear wheels are controlled to have the reverse phase. The operation of transition to the reverse phase mode includes performing an operation of decreasing a gear ratio from a current gear ratio state to −1 during the time for which the first switch (LCS) is selected. For example, the gear ratio is decreased by 0.1 per 200 ms. That is, if the gear ratio is started from 0, an operation of the gear ratio reaching −0.5 after 1 second and reaching −1 after 2 seconds is performed. In this case, it is important that the amount in which the phase of the gear ratio is changed into the reverse phase is determined by the time for which the first switch is held.

Figure 4:
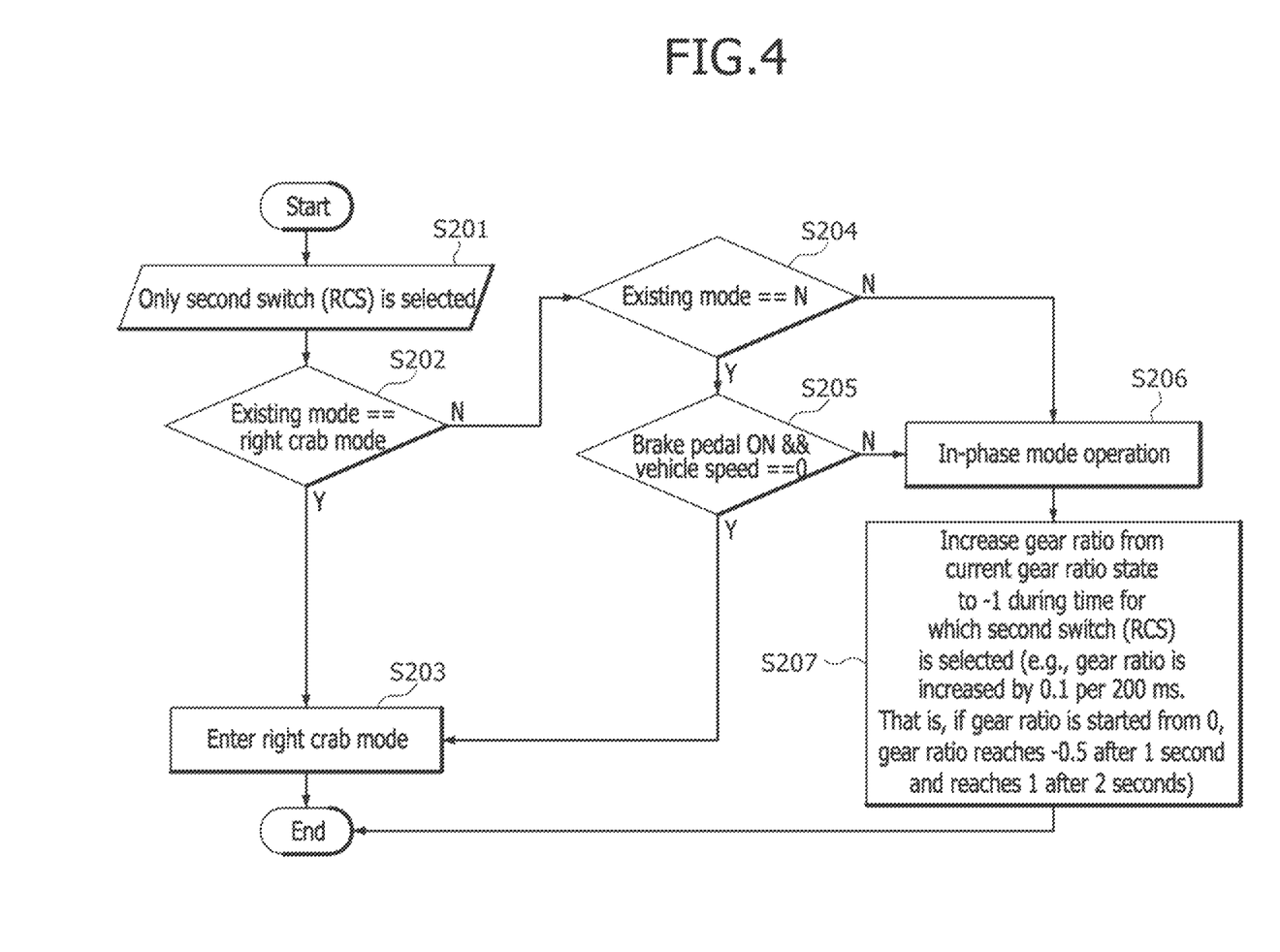
FIG. 4 is a flowchart for illustrating a steering mode transition operation according to the selection of a second switch (RCS) according to a second embodiment of the present disclosure.

Referring to FIG. 4, when only the second switch (RCS) is selected (S201), if the existing mode (i.e., a steering mode that is maintained so far) is a right crab mode (Y in S202), the processor 130 continues to enter (i.e., maintain) the right crab mode (S203).

When only the second switch (RCS) is selected (S201), if the existing mode (i.e., a steering mode that is maintained so far) is not the right crab mode (N in S202) and is the neutral (N) mode, the brake pedal has been stepped on (Brake Pedal ON), and the vehicle is not in the driving state (i.e., a vehicle speed==0) (Y in S205), the processor 130 enters the right crab mode (S203).

That is, the right crab mode is entered when the second switch (RCS) is selected in the state in which a driver steps on the brake pedal and a condition in which the vehicle speed is 0.

When only the second switch (RCS) is selected (S201), if the existing mode (i.e., a steering mode that is maintained so far) is neither the right crab mode (N in S202) nor the neutral (N) mode (N in S204), the processor 130 performs an operation of transition to an in-phase mode (i.e., a mode in which the front wheels and the rear wheels are controlled to have the same phase) (S206).

In this case, the in-phase mode is a mode in which the front wheels and the rear wheels are controlled to have the same phase. The operation of transition to the in-phase mode includes performing an operation of increasing the gear ratio from a current gear ratio state to 1 during the time for which the second switch (RCS) is selected. For example, the gear ratio is increased by 0.1 per 200 ms. That is, if the gear ratio is started from 0, an operation of the gear ratio reaching 0.5 after 1 second and reaching 1 after 2 seconds is performed. In this case, it is important that the amount in which the gear ratio is changed to have the same phase is determined by the time for which the second switch is held.

Figure 5:
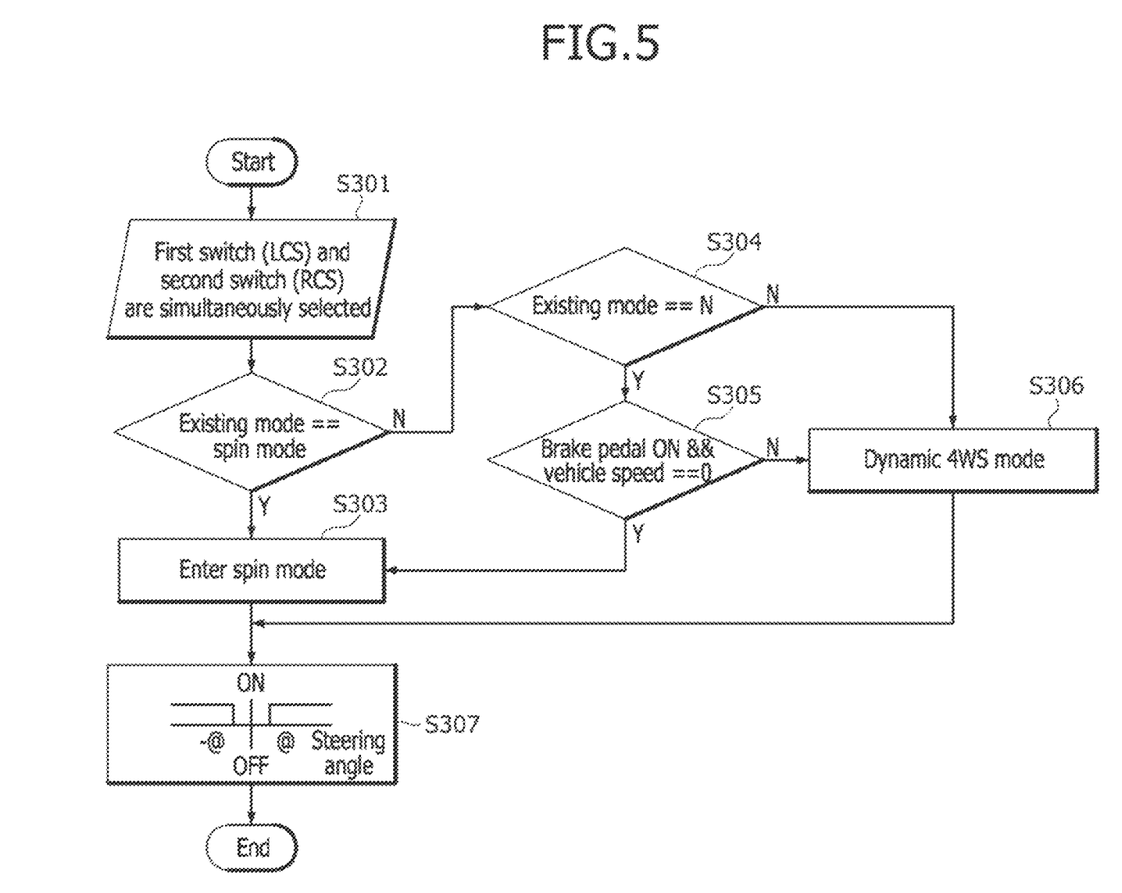
FIG. 5 is a flowchart for illustrating a steering mode transition operation according to the selection of the first switch (LCS) and the second switch (RCS) according to a third embodiment of the present disclosure.

Referring to FIG. 5, when the first switch (LCS) and the second switch (RCS) are simultaneously selected (S301), if the existing mode (i.e., a steering mode that is maintained so far) is a spin mode (Y in S302), the processor 130 continues to enter (i.e., maintain) the spin mode (S303).

When the first switch (LCS) and the second switch (RCS) are simultaneously selected (S301), if the existing mode (i.e., a steering mode that is maintained so far) is not the spin mode (N in S302) and is the neutral (N) mode (Y in S304), the brake pedal has been stepped on (Brake Pedal ON), and the vehicle is not in the driving state (i.e., a vehicle speed==0) (Y in S305), the processor 130 enters the spin mode (S303).

That is, the spin mode is entered when the first switch (LCS) and the second switch (RCS) are simultaneously selected in the state in which a driver has stepped on the brake pedal and a condition in which the vehicle speed is 0. In this case, the rotation direction is determined when the steering wheel is turned to the left (or right).

When the first switch (LCS) and the second switch (RCS) are simultaneously selected (S301), if the existing mode (i.e., the steering mode that is maintained so far) is neither the spin mode (N in S302) nor the neutral (N) mode (N in S304), the processor 130 performs an operation of transition to a dynamic 4WS mode (S306).

In this case, the dynamic 4WS mode is a mode in which the gear ratios of the front wheels and the rear wheels are varied in response to a steering angle speed or angular acceleration. The dynamic 4WS mode is transitioned when the first switch (LCS) and the second switch (RCS) are simultaneously selected in the state in which a vehicle speed is present.

In this case, upon operation of transition to the spin mode or the dynamic 4WS mode, when the steering wheel is turned to the left (or right) by a specific angle (ⓐ) or more, a spin operation (i.e., the spin mode) is performed in a corresponding direction (S307).

For example, when the specific angle (ⓐ) is 10 degrees and the steering wheel is turned −15 degrees (i.e., to the left), the spin operation (i.e., the spin mode) is performed to the left.

Figure 6:
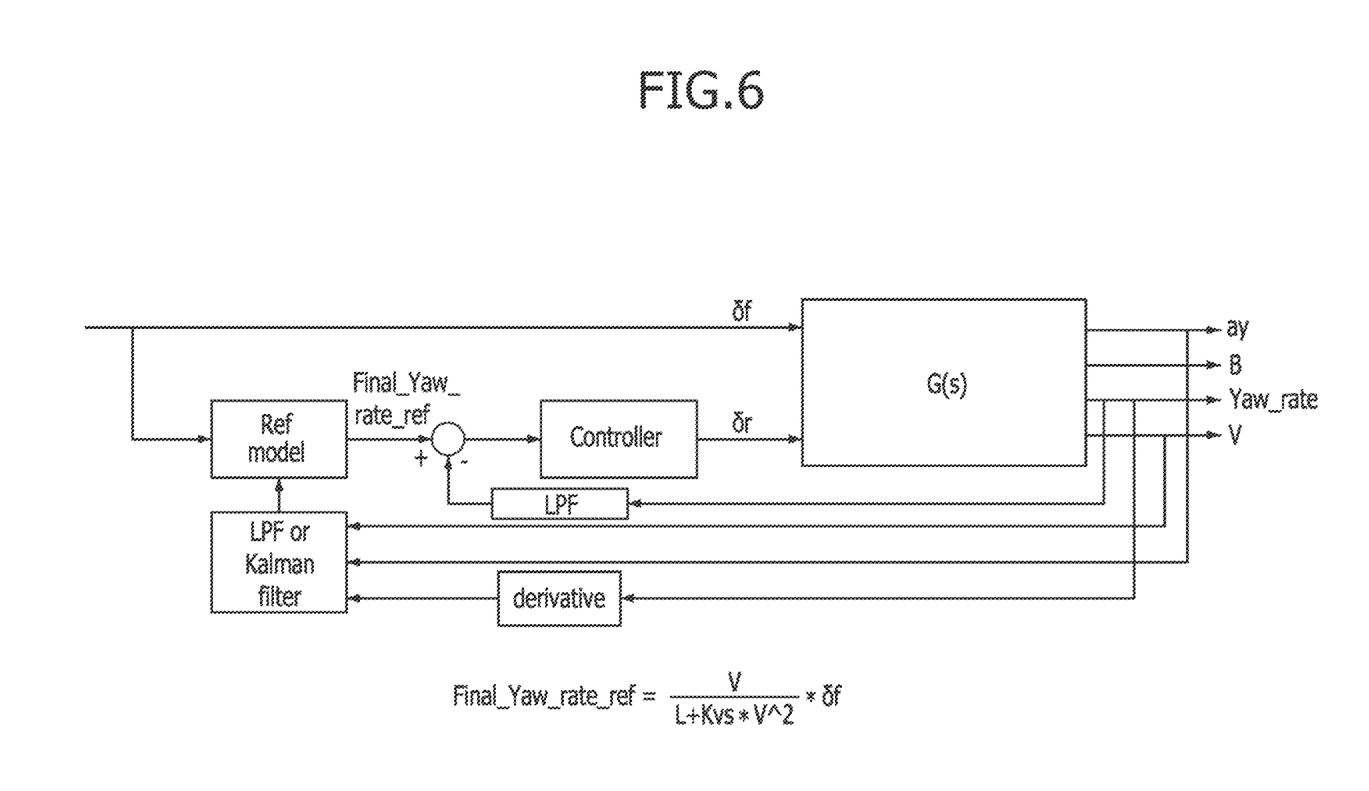
FIG. 6 is an exemplary diagram for describing an operating method of a dynamic 4WS mode in FIG. 5.

For reference, FIG. 6 is an exemplary diagram for describing an operating method of the dynamic 4WS mode in FIG. 5.

Referring to FIG. 6, upon operation in the dynamic 4WS mode, the processor 130 controls the angle of the rear wheels to the front wheels by varying a targeted yaw rate in response to a steering angle speed or steering angular acceleration. That is, the amount of error of a yaw rate that is sensed in a vehicle and that is fed back is made 0 through closed loop control, in other words, a tracking controller by applying an Ref model, that is, an equation for the targeted yaw rate, so that a difference between the targeted yaw rate and the feedback yaw rate becomes 0.

In this case, the sensed yaw rate is filtered by applying a low pass filter (LPF) because the value of the sensed yaw rate includes severe noise.

In this case, it is important that noise is filtered out from the sensed yaw rate, that is, the fed-back yaw rate, through the LPF or a Kalman filter. In the dynamic 4WS mode, all of over, neutral, and under-steer operations are performed based on a steering propensity of a driver, that is, a steering angle speed or angular acceleration, by applying a variable gradient to an actual final yaw rate reference value without applying the existing under-steer gradient through the following equation based on a value of the sensed yaw rate.

$$\text{Steacy\_state\_Yaw\_rate\_ref} = \left(\frac{1}{\frac{L}{V} + K\frac{V}{g}}\right)\delta f$$

$$\delta f = \frac{L}{R} + K_{us} * ay$$

$$= \left(\frac{L}{V} + KK_{us} * V\right) * \text{yaw\_rate\_ref}$$

$$\text{Yaw\_rate\_ref} = \frac{V}{R}$$

$$ay = \frac{V^2}{R}$$

$$\text{Yaw\_rate\_ref} = \frac{V}{L + K_{us} * V^2} * \delta f$$

$$Fyf = \frac{mlr}{2L} * ay + \frac{Iz}{2L} * \text{yaw\_accel}$$

$$Fyr = \frac{mlr}{2L} * ay - \frac{Iz}{2L} * \text{yaw\_accel}$$

$$Fyf = Cf * \alpha f$$

-continued $$Fyr = Cr * \alpha r$$

$$\begin{aligned}\delta f &= \frac{L}{R} + \alpha f - \alpha r \\ &= \frac{L}{R} + \left[\frac{(mlr)}{2CfL} - \frac{mlf}{2CrL}\right) + \left(\frac{1}{2Cf} + \frac{1}{2Cr}\right) + \frac{Iz * yaw_{accel}}{L * ay}\right] * ay \\ &= \frac{L}{R} + (Kus\_ss + \Delta K_{us}) * ay \\ &= K_{vs}\end{aligned}$$

$$\text{Final\_Yaw\_rate\_ref} = \frac{V}{L + K_{vs} * V^2} * \delta f$$

Wherein $K_{us}$ means an under-steer gradient, $K_{vs}$ means a variable steer gradient, V means a vehicle speed, L means a vehicle wheel base length, g means gravity acceleration, δf means a front wheel steering angle, δr means a rear wheel steering angle, Cf means cornering stiffness of a front wheel, Cr means cornering stiffness of a rear wheel, Iz means inertia moment of the vehicle, Fyf means a lateral force of a front wheel, Fyr means a lateral force of the rear wheel, R means a radius of rotation, ay means lateral acceleration, and m means vehicle weight.

An operation of the final yaw rate in the dynamic 4WS mode may be known through the deployment of the equation as described above. As a result, the variable steer gradient is determined by yaw acceleration, and depends on steering angular acceleration. In other words, in the present embodiment, the existing under-steer gradient is applied as the variable steer gradient, thereby enabling dynamic 4WS control.

As described above, an embodiment of the present disclosure has an effect in that a steering mode transition operation of the 4-wheel independent steering system can be conveniently performed by using a smaller number of switches than the existing number of switches. Furthermore, an embodiment of the present disclosure has effects in that a steering mode transition operation can be performed by using the switches included in a steering wheel and the steering mode can be organizationally transitioned without a collision between steering modes of the 4-wheel independent steering system.

What is claimed is:

1. An apparatus for controlling a 4-wheel independent steering system of a vehicle, the apparatus comprising:
a sensor module;
a switch module comprising a plurality of switches configured for receiving an instruction for a transition of a steering mode of the 4-wheel independent steering system; and
a processor configured to execute a set of instructions stored on a storage medium to perform a steering mode transition operation of the 4-wheel independent steering system based on a combination of selections of the switches of the switch module),
wherein:
the switch module comprises a first switch of the plurality of switches and a second switch of the plurality of switches,
the first switch is located on a left-side of a steering wheel of the 4-wheel independent steering system and is configured to activate the processor to control transition of the 4-wheel independent steering system into and out of a left crab mode based on operations of the first switch, and the second switch is located on a right-side of the steering wheel and is configured to activate the processor to control transition of the 4-wheel independent steering system into and out of a right crab mode based on operations of the second switch.

2. The apparatus of claim 1, wherein the instructions cause the processor to perform further operations of:
continuing to maintain the left crab mode if a steering mode that is currently being maintained is the left crab mode when only a first switch (LCS) of the plurality of switches is selected,
entering the left crab mode if a steering mode that is currently being maintained is not the left crab mode and is a neutral (N) mode, a brake pedal of the vehicle has been stepped on (Brake Pedal ON), and the vehicle is not in a driving state (a vehicle speed==0), when only the first switch (LCS) is selected, and
performing an operation of transition to a reverse phase mode if a steering mode that is currently being maintained is neither the left crab mode nor the neutral (N) mode when only the first switch (LCS) is selected.

3. The apparatus of claim 2, wherein:
the reverse phase mode is a mode in which front wheels and rear wheels of the vehicle are controlled to have a reverse phase, and
the operation of transition to the reverse phase mode is a mode in which an operation of decreasing a gear ratio of the vehicle from a current gear ratio state to −1 is performed during a time for which the first switch (LCS) is selected.

4. The apparatus of claim 1, wherein the instructions cause the processor to perform the further operations of:
continuing to maintain the right crab mode if a steering mode that is currently being maintained is the right crab mode when only the second switch (RCS) is selected,
entering the right crab mode if a steering mode that is currently being maintained is not the right crab mode and is a neutral (N) mode, a brake pedal of the vehicle has been stepped on (Brake Pedal ON), and the vehicle is not in a driving state when only the second switch (RCS) is selected, and
performing an operation of transition to an in-phase mode if a steering mode that is currently being maintained is neither the right crab mode nor the neutral (N) mode when only the second switch (RCS) is selected.

5. The apparatus of claim 4, wherein:
the in-phase mode is a mode in which front wheels and rear wheels of the vehicle are controlled to have an identical phase, and
the operation of transition to the in-phase mode is a mode in which an operation of increasing a gear ratio of the vehicle from a current gear ratio state to 1 is performed during a time for which the second switch (RCS) is selected.

6. The apparatus of claim 1, wherein instructions cause the processor to perform the further operations of:
continuing to maintain a spin mode when a steering mode that is currently being maintained is the spin mode when the first switch (LCS) and the second switch (RCS) are simultaneously selected,
entering the spin mode if a steering mode that is currently being maintained is not the spin mode and is a neutral (N) mode, a brake pedal of the vehicle has been stepped on (Brake Pedal ON), and the vehicle is not in a driving state (a vehicle speed==0) when the first switch (LCS) and the second switch (RCS) are simultaneously selected, and performing an operation of transition to a dynamic 4-wheel drive (4WS) mode if a steering mode that is currently being maintained is neither the spin mode nor the neutral (N) mode when the first switch (LCS) and the second switch (RCS) are simultaneously selected.

7. The apparatus of claim 6, wherein the dynamic 4WS mode is a mode in which gear ratios of front wheels and rear wheels of the vehicle are varied in response to a steering angle speed or angular acceleration, and is a mode in which a spin operation is performed in a corresponding direction when a steering wheel of the vehicle is turned left or right at a specific angle (ⓐ) or more upon operation of transition to the spin mode or the dynamic 4WS mode.

8. A method of controlling a 4-wheel independent steering system of a vehicle, the method comprising:
receiving, by a processor, an instruction for transition of a steering mode of the 4-wheel independent steering system of the vehicle through a plurality of switches of a switch module; and
performing, by the processor, a steering mode transition operation of the 4-wheel independent steering system based on a combination of selections of the switches of the switch module,
wherein:
the switch module comprises a first switch of the plurality of switches and a second switch of the plurality of switches,
the first switch is located on a left-side of a steering wheel of the 4-wheel independent steering system and is configured to activate the processor to control transition of the 4-wheel independent steering system into and out of a left crab mode based on operations of the first switch, and
the second switch is located on a right-side of the steering wheel and is configured to activate the processor to control transition of the 4-wheel independent steering system into and out of a right crab mode based on operations of the second switch.

9. An apparatus for controlling a 4-wheel independent steering system of a vehicle, the apparatus comprising:
a sensor module;
a switch module comprising a plurality of switches configured for receiving an instruction for a transition of a steering mode of the 4-wheel independent steering system; and
a processor configured to execute a set of instructions stored on a storage medium to perform a steering mode transition operation of the 4-wheel independent steering system based on a combination of selections of the switches of the switch module), wherein the instructions cause the processor to perform further operations of at least one of the following operations:
(A) continuing to maintain a left crab mode if a steering mode that is currently being maintained is the left crab mode when only a first switch (LCS) of the plurality of switches is selected,
entering a left crab mode if a steering mode that is currently being maintained is not the left crab mode and is a neutral (N) mode, a brake pedal of the vehicle has been stepped on (Brake Pedal ON), and the vehicle is not in a driving state (a vehicle speed==0), when only the first switch (LCS) is selected, and
performing an operation of transition to a reverse phase mode if a steering mode that is currently being maintained is neither the left crab mode nor the neutral (N) mode when only the first switch (LCS) is selected; or
(B) continuing to maintain a right crab mode if a steering mode that is currently being maintained is the right crab mode when only the second switch (RCS) is selected,
entering the right crab mode if a steering mode that is currently being maintained is not the right crab mode and is a neutral (N) mode, a brake pedal of the vehicle has been stepped on (Brake Pedal ON), and the vehicle is not in a driving state when only the second switch (RCS) is selected, and
performing an operation of transition to an in-phase mode if a steering mode that is currently being maintained is neither the right crab mode nor the neutral (N) mode when only the second switch (RCS) is selected; or
(C) continuing to maintain a spin mode when a steering mode that is currently being maintained is the spin mode when the first switch (LCS) and the second switch (RCS) are simultaneously selected,
entering the spin mode if a steering mode that is currently being maintained is not the spin mode and is a neutral (N) mode, a brake pedal of the vehicle has been stepped on (Brake Pedal ON), and the vehicle is not in a driving state (a vehicle speed==0) when the first switch (LCS) and the second switch (RCS) are simultaneously selected, and
performing an operation of transition to a dynamic 4-wheel drive (4WS) mode if a steering mode that is currently being maintained is neither the spin mode nor the neutral (N) mode when the first switch (LCS) and the second switch (RCS) are simultaneously selected.

* * * * *